United States Patent [19]

Tysver et al.

[11] Patent Number: 4,877,120

[45] Date of Patent: Oct. 31, 1989

[54] ACTUATOR MECHANISM HAVING ADJUSTABLE STOP

[75] Inventors: John D. Tysver; Duane Grimm, both of Rockford, Ill.

[73] Assignee: Sunstrand Corp., Rockford, Ill.

[21] Appl. No.: 165,607

[22] Filed: Mar. 8, 1988

[51] Int. Cl.⁴ ............................................. F16D 71/00
[52] U.S. Cl. ..................................... 192/141; 192/139
[58] Field of Search ................................ 192/141, 139

[56] References Cited

U.S. PATENT DOCUMENTS

| 1,796,232 | 3/1931 | Barnes | 192/141 |
| 2,547,475 | 4/1951 | Larsen | 192/139 |
| 2,714,822 | 8/1955 | Reeves | 74/509 |
| 2,820,600 | 1/1958 | Brunner | 192/141 |
| 2,839,603 | 6/1958 | Foll et al. | 192/139 |
| 3,029,660 | 4/1962 | Sears | 74/424.88 |
| 3,262,535 | 7/1966 | DePasqua | 192/141 |
| 3,333,477 | 8/1967 | Denkowski | 74/10.2 |
| 3,650,156 | 3/1972 | Thomas | 74/10.2 |
| 3,782,043 | 1/1974 | Shiga | 51/165.78 |
| 4,250,762 | 2/1981 | Weatherby | 74/89.15 |
| 4,641,737 | 2/1987 | Gillingham et al. | 192/141 |

FOREIGN PATENT DOCUMENTS

| 2606440 | 9/1976 | Fed. Rep. of Germany | 192/141 |
| 13237 | 5/1895 | United Kingdom | 192/141 |

Primary Examiner—Rodney H. Bonck
Assistant Examiner—David A. Testardi
Attorney, Agent, or Firm—Antonelli, Terry & Wands

[57] ABSTRACT

An actuator includes a main shaft (16) at the input of a speed reducing gear unit (29-32) which carries an overtravel stop mechanism. The grounded stops (68) are adjustable by a worm gear (72) to allow a near infinite resolution of the position for the overtravel stop of the driven member (16). Rotating stop members (52) are mounted for translation along the main shaft (16). When traveling nut (44) engages a cam surface (60), cam follower (56) translates the normally rotating stop members (52) in a direction opposing the bias force of a compression spring (36) into a stop condition against the grounded fixed stop (68) on wheel (50).

15 Claims, 4 Drawing Sheets

ACTUATOR MECHANISM HAVING ADJUSTABLE STOP

1. Technical Field

This invention relates to an actuating mechanism which is provided with a stop to prevent overtravel of a driven member, and more particularly to an arrangement of the stop members which allows near infinite resolution of positioning for the overtravel stop position of the driven member.

2. Background Art

Mechanical stops for operational positioning or overtravel protection are employed in many aircraft actuation systems. Placing a mechanical overtravel stop directly at the output of a gear actuator creates excessive loads on the stop and on the gears due in part to inertial effects at impact. Also, it is important in many applications such, for example, as aircraft door closures, to have the ability to adjust the position of overtravel stops with a minimum amount of disassembly for re-timing.

U.S. Pat. No. 4,641,737 to Gillingham and Metcalf issued Feb. 10, 1987 discloses an actuator similar to the actuator here disclosed. However, it lacks the feature of overtravel stop adjustability which limits its applicability and effects overtravel protection by a counting means which includes a shaft that is separate from the main shaft.

DISCLOSURE OF THE INVENTION

An object of the present invention is to provide a novel overtravel stop where adjustability of the stop position is easily performed in the field by the usual service personnel without disassembly.

A further object is to provide a novel counting mechanism adapted to be positioned within existing space of an actuator housing and located at a gear train input to thereby provide precise control of the overtravel stop position, whether or not the stop position adjustability feature is employed.

Yet another object resides in providing a novel stop mechanism that is mounted coaxially about a main shaft and is positioned to utilize space between the main shaft and a sun gear of a geared rotary actuator connected to an output shaft.

A yet further object of the present invention relates to providing a novel wheel which carries the fixed or grounded stop members together with an adjustment worm gear that allows near infinite resolution of positioning an overtravel stop with no disassembly for re-timing.

These and other objects of the invention will become more fully apparent from the claims and from the following description when read in conjunction with the appended drawings.

BEST MODE FOR CARRYING OUT THE INVENTION

Figure 1:
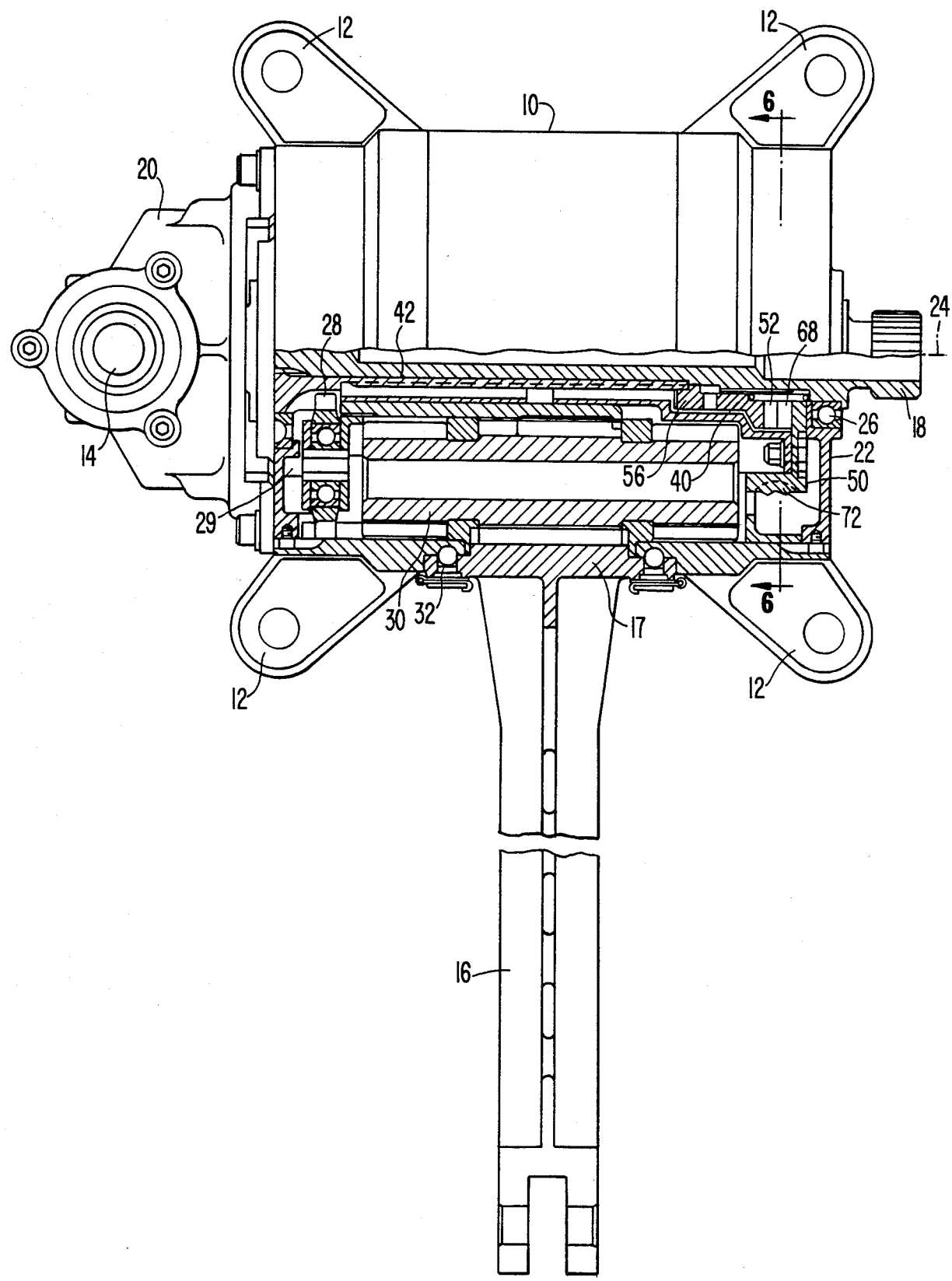
FIG. 1 is a front elevation, partially in section, showing an overview of a actuator incorporating the present invention, the overall length dimension being about twelve inches and yet the actuator is suitable for use in closing an aircraft door.
Figure 2:
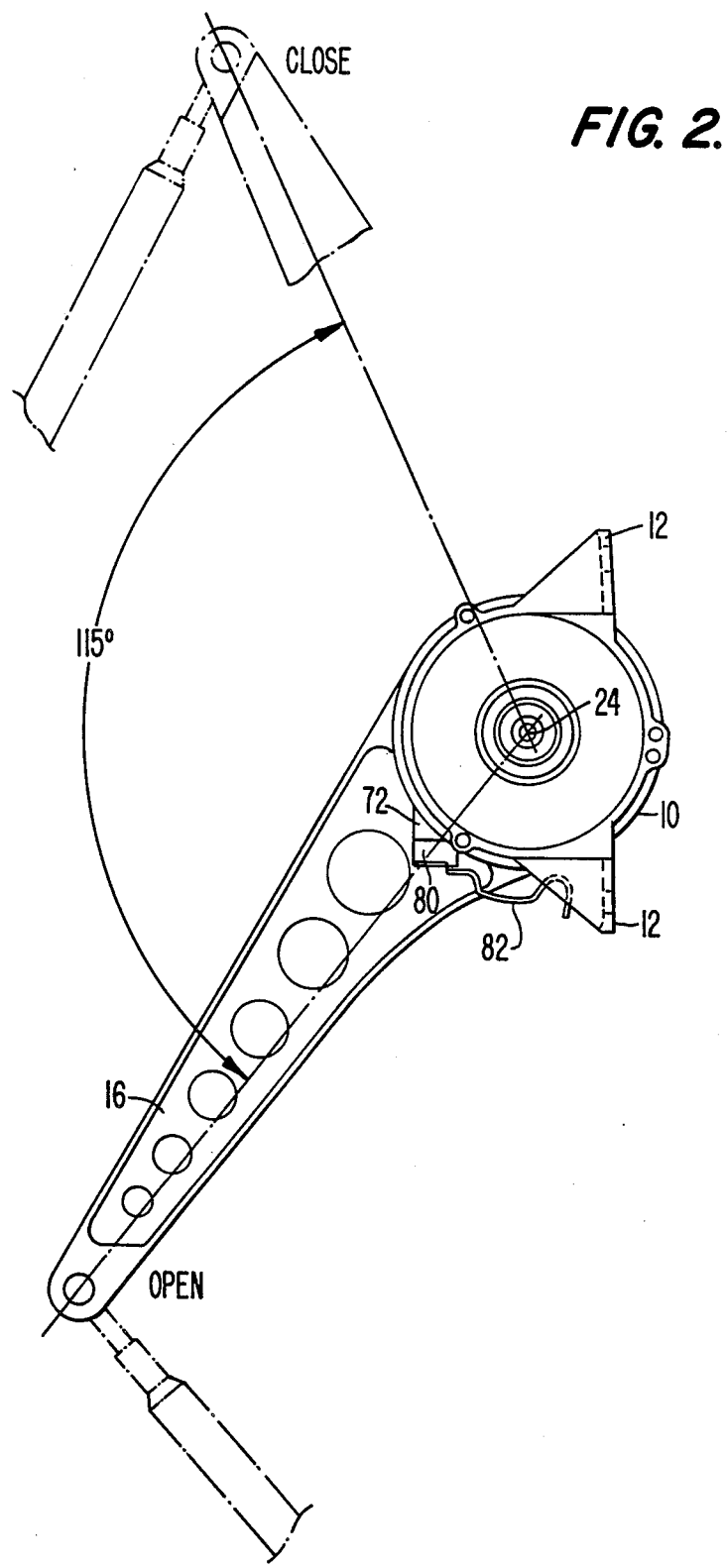
FIG. 2 is an end elevation of the mechanism of FIG. 1 showing movement of a door closing arm between a door open and a door closed position.

With reference to FIGS. 1 and 2, the actuator of the present invention may be provided with a housing 10 having mounting legs 12. A bidirectional rotary input at 14 is used to drive, for example, a door closure arm 16 on an output shaft 17 which is here shown to be adapted to swing through an angle of about 115° as illustrated in FIG. 2 between a "door open" position shown in solid lines and a "door close" position shown in dotted lines.

The reversible rotary drive at input 14 may be transferred to a main shaft 18 that extends from a bevel gear housing 20 to a threaded end at 22. Main shaft 18, which has a center line or axis 24, is illustrated to have a hollow central bore and is suitably supported in housing 10, in part by spaced bearings as at 26.

Main shaft 18 has an exterior surface that includes gear teeth 28 at the left side as viewed in FIG. 1 which drive the input of a simple input planetary gear 29 which in turn controls movement of door closure arm 16 through an output planetary gear 30 and ball bearing ring gear support 32 all as is diagrammatically illustrated in FIG. 1.

Figure 3:
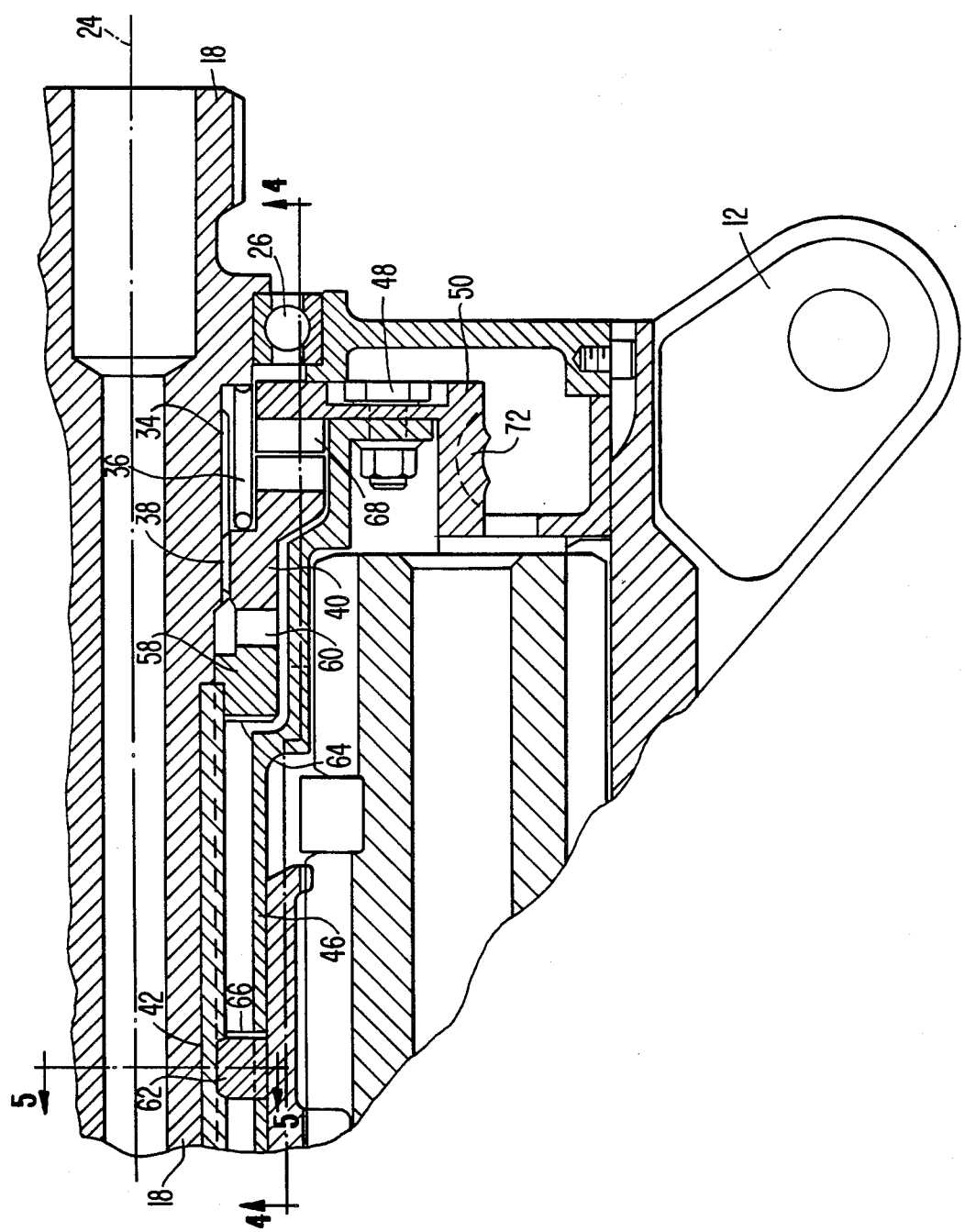
FIG. 3 is a partial front elevation in section showing the lower right hand quarter of FIG. 1 to an enlarged scale.
Figure 4:
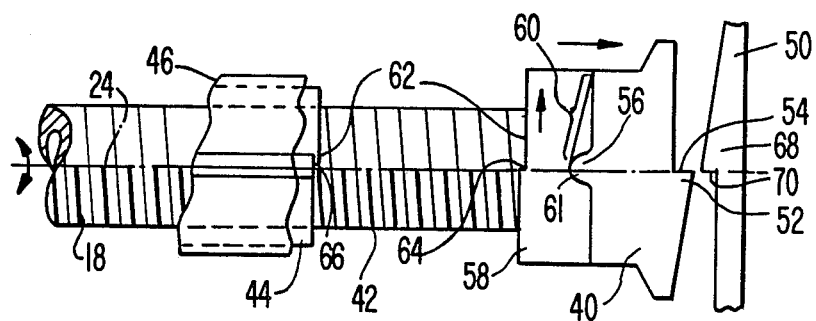
FIG. 4 is a diagrammatic view of several functional parts taken generally along line 4—4 of FIG. 3.
Figure 5:
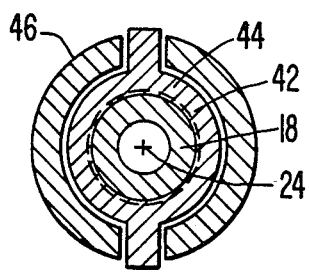
FIG. 5 is an end elevation in section taken along line 5—5 of FIG. 3 illustrating certain of the parts which are symmetrical about the main shaft axis.

With reference now also to FIGS. 4 and 5, main shaft 18 at its other end at a position inboard of bearing 26 is provided with a recess containing spline teeth 34 (see FIG. 3) that extend across a cavity in which a cam return spring 36 is placed. Spline teeth 34 mesh with the teeth 38 on the inner annular surface of rotating stop member 40.

Mainshaft 18, along its intermediate portion, carries a screw thread 42 onto which a traveling nut 44 is threaded. Translation of nut 44 along the length of shaft 18 serves as a counting mechanism for the gear train to monitor the travel position of the door closure arm 16.

Rotation of nut 44 is prevented by a slotted sleeve 46 that is shown also in FIGS. 4 and 5. In the illustrated embodiment, slotted sleeve 46 is secured by a fastener or bolt 48 to wheel 50 which is stationary during normal operation.

Rotating stop member 40 is mounted for rotation coaxially with main shaft 18 at the position as illustrated in FIGS. 3 and 4. Rotating stop member 40 is adapted for translation or sliding axial movement along mainshaft 18 toward the right against the force of cam return spring 36, which may be a compression spring in the form of a helix that is also coaxial with main shaft 18.

Rotating stop member 40 has one or more stop members 52 each having an abutment surface 54 extending from the face on its right hand side as viewed in FIGS. 3 and 4. On the opposite face, rotating stop member 40 has one or more projections 56 which function as a cam follower.

Trigger cam member 58 has sloping cam surfaces 60 which correspond in number to the number of projections 56 on rotating stop 40. The cam surface 60 includes a rear cam wall 61 which may conform to the shape of the projection 56 on rotating stop 40. Trigger cam member 58 has an inner annular surface which allows trigger cam member 58 to freely rotate relative to main shaft 18. Trigger cam member 58 is urged to its illustrated position against screw thread 42 on main shaft 18 by the force of cam return spring 36 acting through rotating stop member 40. Because of this construction, trigger cam member 58 is normally caused to rotate by the engagement of projections 56 with cam surface 60 as rotating stop 40 is driven by a main shaft 18 through mating teeth 34 and 38.

Trigger cam member 58 has on its other face trigger jaws 62 which include a surface 64 that is near the travel nut 44. Trigger jaws 62 include also a mating surface 66 on the face of nut 44 that is near trigger cam member 58. As the non-rotating nut 44 translates along main shaft 18 and contacts rotating trigger cam member 58, surfaces 64 and 66 engage to abruptly halt rotation of trigger cam member 58. The axial extent of surfaces 64 and 66 is preferably equal to the lead of the screw thread 42 and the placement of trigger cam member 58 is arranged such that during the final pass of surfaces 64 and 66 before actual engagement, the clearance is as small as is practicable to be without contact. Thus, when engagement occurs, the full areas of surfaces 64 and 66 are in contact. Alternatively, a second pair of trigger jaws may be provided at a position diametrically opposite the position of trigger jaws 62 of the surfaces 64 would not exceed about one-half of the lead of the threaded portion 52.

Figure 6:
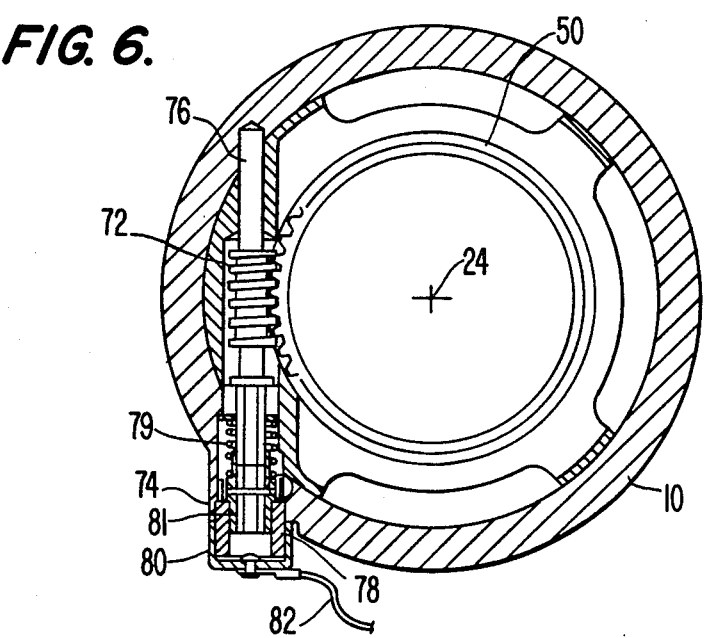
FIG. 6 is an end elevation in section taken along line 6—6 of FIG. 1 showing the wheel which carries the fixed or grounded stops and its manually operable adjusting worm gear.

With reference now to FIGS. 1, 4 and 6, wheel 50 may be mounted to be coaxial with main shaft 18 and have one, or preferably more fixed or grounded stops 68 to distribute better the stresses due to shock load forces, with each stop 68 having an abutment surface 70 that is adapted for engagement with a corresponding abutment surface 54 of rotating stop member(s) 52 on rotating member 40. The spacing of the adjacent edges of abutment surfaces 54 which rotate and 70 which are stationary as illustrated in FIG. 4, is such that rotation is free of contact until rotation of cam trigger member 58 is arrested.

The exact position at which rotation of trigger cam 58 is arrested, is determined by the radial direction of trigger jaw surface 66 on traveling nut 44 when trigger jaws 62 reach a locked position. The orientation of travel nut 44 is, in turn, controlled by the angular position of slotted sleeve 46.

Because slotted sleeve 46 is secured to wheel 50 by fastener 48, any adjustment of the stop position of fixed stop 68 by rotation of wheel 50 causes a concomitant rotation of slotted sleeve 46 thereby maintaining the proper timing and alignment of the pair of trigger jaws 62, of the cam surface 60 and cam follower projection 56 on gear member 40, and of the stop surfaces 54 on gear member 40 and the fixed stop surfaces 70 on wheel 50.

Adjustment of the radial direction of fixed stop(s) 68 by rotation of wheel 50 is provided by an adjustment worm gear 72 of conventional construction that is positioned in a worm gear housing 74 as shown in FIG. 6 where the longitudinal axis of the worm gear 72 is shown to be parallel to the plane of rotation of wheel 50. The shaft 76 for the worm gear 72 is mounted to avoid longitudinal movement thereby preventing angular movement of wheel 50 due to shock loading which occurs upon abrupt engagement of abutment surface 54 and 70 of the rotating stop members 52 and ground stops 68 respectively.

The shaft 76 for the worm gear 72 may be grounded against rotational movement by a sliding coupling 81 which is held in engagement to the splined sleeve 78 by a helical compression disengagement spring 79, which may be mounted coaxially about shaft 76. A protective cap 80 is shown to be tethered to the housing 10 as by a wire 82. Removal of cap 80 exposes sliding coupling 81. Applying an axial force on coupling 81 against the force of disengagement spring 79 until the shaft splines are out of engagement with the fixed spline elements, allows rotation of shaft 76 and worm gear 72. Thus, an adjustment of the stop position can readily be made by the usual service personnel after a door has been installed without disassembly of the actuator except for cap 80.

By rotating worm gear 72, the fixed stop(s) 68 and the slotted sleeve 46 rotate. Rotation of slotted sleeve changes the angular position of the traveling nut 44 and thus maintains the timing of the mechanism as the stop position of main shaft 18 is adjusted. That stop position is reflected to the output shaft 17 and arm 16 through the gear train.

At the time of traveling nut and trigger cam contact by means of surface 66 and 64, only a small amount of energy is absorbed: the inertial effect of bringing the trigger cam 58 to a stop and the axial force of compressing the cam return spring 36 as cam follower projection 56 slides along cam surface 60. The entire system loads and inertias are then absorbed in the primary stop jaw abutment surface 54 and 70 of the rotating stop 40 and the fixed stop 68.

Upon reversal of the direction of rotation of main shaft 18, the cam return spring 36 urges rotating stop member 40 to its illustrated position with projection 56 at the low point of cam surface 60 while at the same time travelling nut 44 backs away from trigger cam member 58.

Although only a single embodiment of the invention has been dscribed, many of the operative parts may be formed on companion members and re-positioned without departing from the spirit of the present invention. Accordingly, all changes, modifications and equivalents which fall within the scope of the claims are intended to be covered thereby.

We claim:

1. A mechanism containing an adjustable mechanical stop to provide protection against overtravel of a rotatable main shaft having a longitudinal axis comprising:
    a housing for supporting said main shaft for rotation about said shaft axis;
    a wheel mounted in said housing and having fixed stops thereon at a plurality of spaced positions radially outwardly of said main shaft;
    means mounted to said housing and drivingly connected to the wheel to control the position of said wheel for adjustably controlling the angular position of said wheel and fixed stops about said main shaft;
    a member including stop members mounted for rotation with said main shaft and for translation along said main shaft between a running position where the stop members do not contact the fixed stops and a locking position where the stop members are engaged with said fixed stops;

biasing means for normally maintaining said stop members in said running position; and means responsive to a predetermined number of revolutions of the main shaft as measured from an index position for causing said stop members to translate in a direction along the main shaft axis against the bias force of said biasing means from said running position into said locking position.

2. The mechanism as defined in claim 1, wherein said main shaft is adapted for rotational movement through a plurality of revolutions from a predetermined position before reaching an overtravel position and is connected to a gear train for driving a load shaft through an angle less than one revolution whereby the precise stop position of the output shaft is controlled by the angular position of said wheel.

3. The mechanism as defined in claim 2, wherein the load shaft is part of an actuator for opening and closing a door on an aircraft.

4. The mechanism as defined in claim 1, wherein said wheel position control means comprise a worm gear assembly which includes:

a shaft having a helical thread in positive engagement with said wheel;

a sliding coupling coupled to said worm gear shaft; and spring means biasing said sliding coupling into locking engagement with said housing after the position of said wheel has been adjusted.

5. The mechanism as defined in claim 1, further including:

a nut mounted for translation along a direction parallel to said main shaft axis;

a trigger cam mounted about said main shaft for rotation with said member and positioned to be engaged by said nut when the nut reaches a predetermined longitudinal position along said main shaft axis;

means associated with said nut and said trigger cam to stop rotation of the trigger cam when the nut reaches a predetermined position; and cam surfaces on said member and said trigger cam for translating the stop members into a locking engagement position with said fixed stops during no more than about one-half revolution of said main shaft after engagement of said nut and trigger cam.

6. The mechanism as defined in claim 5, wherein said nut is threaded on said main shaft and is restrained against rotation relative to the mainshaft by a slotted sleeve, said slotted sleeve being mounted to surround said main shaft in a spaced relationship and being secured to turn with said wheel whereby adjustment of the angular position of said wheel by said wheel position control means causes a corresponding adjustment of the angular position of said slotted sleeve.

7. A shaft stop mechanism for a main shaft mounted for rotation about a longitudinal axis, said shaft being adapted to be connected to an output gear train which drives a load shaft that is stopped at a precisely controlled fixed position comprising:

a nut threaded on the main shaft to serve as a counting mechanism and prevent overtravel of said load shaft;

a slotted sleeve associated with the nut and so arranged that as the shaft rotates, the nut does not rotate relative to the sleeve and is translated along the longitudinal axis of the shaft;

fixed stops mounted coaxially relative to the shaft axis;

stop members mounted coaxially relative to the shaft axis and adapted for locking engagement with said fixed stops, said stop members being carried on an annular surface mounted for rotational movement with said shaft and for translation along the shaft from a first running position where the stop members pass closely adjacent the fixed stops while avoiding contact therewith and a second lock position where the stop members are fully engaged with the fixed stops; and means located on the main shaft between the nut and the annular surface, and responsive to the nut reaching a predetermined position relative to said annular surface during rotation of the main shaft for causing translation of said annular surface in not more than about 180° of additional shaft rotation to provide full engagement between the stop members and the fixed stops.

8. The shaft stop mechanism as defined in claim 7, wherein the last mentioned means comprises a trigger cam member mounted about said shaft for rotation independent of any shaft rotation and wherein said annular surface is part of a rotation member which includes a cam follower means associated therewith for normally driving said trigger cam member for rotation with said shaft; and wherein said trigger cam member is effective when engaged by said nut to cause translation of said annular surface and said stop members.

9. The shaft stop mechanism as defined in claim 8, wherein said trigger cam member is formed with a pair of surfaces that are generally normal to the shaft axis and said nut has an end surface generally parallel to and facing one of said trigger cam member surfaces; and trigger jaws on the facing surfaces of said nut and said trigger cam member for halting rotation of said trigger cam member upon contact between said facing surfaces and engagement of said trigger jaws.

10. The shaft stop mechanism as defined in claim 9, wherein said trigger cam member on the other of its pair of surfaces has a sloping cam surface angularly related to a plan that is normal to the shaft axis, said sloping cam surface engaging a cam follower of said cam follower means and being effective to translate said annular surface and said stop members in a direction along the shaft axis when said trigger jaws are engaged.

11. A shaft stop mechanism as defined in claim 7 further comprising a stop member return spring encircling the shaft and urging said annular surface carrying the stop members toward a position of non-engagement with said fixed stop members.

12. The shaft stop mechanism as defined in claim 7, wherein said fixed stops are mounted on a wheel which surrounds the shaft together with adjusting means accessible from the exterior of the mechanism to allow incremental movement of the wheel to determine the precise position of the fixed stops and thereby precisely control the final position of the load shaft.

13. The shaft stop mechanism as defined in claim 12, wherein the load shaft is part of an actuator for opening and closing a door on an aircraft.

14. The shaft stop mechanism as defined in claim 12, wherein the adjusting means comprises a worm gear in operative engagement with said wheel and means for locking said worm gear relative to a frame of said mechanism including a splined sleeve that is axially displaceable to allow rotation of the worm gear and spring biased into locking engagement with said frame after the position of the wheel has been adjusted.

15. The shaft stop mechanism as defined in claim 12, wherein said slotted sleeve is mounted to turn concomitantly with said wheel to thereby maintain a constant relationship between the angular position of the line of engagement of the trigger jaws and the angular position of the fixed stops.

* * * * *